United States Patent [19]
Holcomb et al.

[11] Patent Number: 5,933,085
[45] Date of Patent: Aug. 3, 1999

[54] ENVIRONMENTAL CONTROL LOCK SYSTEM

[75] Inventors: Glen Holcomb, N. Richland Hills; William Reed, Arlington, both of Tex.

[73] Assignee: Vingcard a.s., Norway

[21] Appl. No.: 08/634,883

[22] Filed: Apr. 19, 1996

[51] Int. Cl.$^6$ ............................. G05D 23/00; F28F 27/00
[52] U.S. Cl. ................... 340/825.31; 340/825.34; 340/571; 235/382; 235/382.5; 70/278; 165/200; 165/201; 165/237; 307/116; 236/44 C; 236/44 R
[58] Field of Search ................... 340/825.31, 825.34, 340/539, 591; 235/382, 382.5; 70/278; 165/200, 201, 237; 307/116; 236/44 C, 44 R

[56] References Cited

U.S. PATENT DOCUMENTS

| | | | |
|---|---|---|---|
| 4,101,886 | 7/1978 | Grimes et al. | 165/237 |
| 4,485,864 | 12/1984 | Carrell et al. | 165/11.1 |
| 4,534,194 | 8/1985 | Aydin | 70/278 |
| 4,717,816 | 1/1988 | Raymond et al. | 235/382.5 |
| 4,851,828 | 7/1989 | Yamashita | 340/825.31 |
| 5,591,950 | 1/1997 | Imedio-Ocana | 235/382.5 |

FOREIGN PATENT DOCUMENTS

| | | |
|---|---|---|
| 696769 | 2/1996 | European Pat. Off. . |
| 2272481 | 5/1994 | United Kingdom . |
| 9520782 | 8/1995 | WIPO . |

OTHER PUBLICATIONS

North American Technologies, Inc. brochure—Sensorstat Occupancy Sensing HVAC Controller, No Month/Year.
North American Technologies, Inc. brochure—innPULSE Guest Room Management and Information System—Oct. 1993.
Teledex brochure—Comfort Central Guest Room Climate Control System, No Month/Year.
NRG Management Systems, Inc. brochure—In—Room Information System—NRG Management Systems No Month/Year.
Alerton Technologies, Inc. brochure—Energy Management & Controls for Hotels, May 1995.

Primary Examiner—William A. Cuchlinski, Jr.
Assistant Examiner—Yonel Beaulieu
Attorney, Agent, or Firm—Bierman, Muserlian and Lucas

[57] ABSTRACT

The electric lock system combines an electric lock with an energy control unit such that when a guest key is used in the lock, the lock communicates with the energy control unit to move from an unsold state to a sold state. Optionally, the guest key has information which tells the lock when the guest will leave and the lock communicates to the energy control unit to move from the sold state to an unsold state. Another option, includes a motion detector and door switch which allows the lock to detect the presence of the guest in the room and allows the lock to further employ an occupied and unoccupied state. The combination of the electric lock system and the energy control unit provides energy savings in the heating and cooling of the room.

17 Claims, 9 Drawing Sheets

ENVIRONMENTAL CONTROL LOCK SYSTEM

BACKGROUND OF THE INVENTION

1. Field of the Invention

The present invention relates to electronic lock systems and, more specifically, to a combination of an electronic lock system and an environmental control system for controlling the heating and cooling units in a room.

2. Prior Art

Electronic lock systems are commonly employed in hotels, motels, cruise ships and ferries where a room is rented to a guest for a short period of time and there is a need for a high level of security. The electronic lock system, in essence, provides each new guest with a new key and rekeys the lock for each new key used in the lock. Typically, an electronic lock system comprises a key generating station which is located at the check-in counter or front desk of the hotel and an electronic lock which is mounted in a door of a room and provides access to the room. The lock is opened by a key having magnetic data (key code) thereon. Typically, the key is in the form of a card and the magnetic data is encoded onto the key by the key generating station when it is assigned to the guest at the front desk. The lock has a means to read the magnetic data on the key and a microcontroller to compare the key code with an access code. The access code is either generated by the microcontroller through an algorithm or is stored in the memory of the microcontroller. If there is a match between the access code and the key code, then the lock opens and allows access to the room.

In order to insure that the key code and the access code match, the key generating station is either hard wired to the electronic lock so that it can communicate the new key code to the electronic lock; or the key generating station and the microcontroller use the same algorithm to calculate the codes; or the key generating station and the microcontroller store the same codes in their memories.

There are a number of ways that the lock system invalidates a guest key. For instance, the mere use of a new guest key with a new guest key code causes the previously used guest key code to be invalidated. In other cases, the key code includes a start time and an end time or a time period, e.g. a number of hours, during which the guest key code is valid. The use of a time period invalidates the guest key code at the end of the time period, without the need for a new guest key to be inserted in the lock. The use of time thus allows greater control by management of the access to the room by the guests.

Because of the increased security of the electronic lock, most hotels and the like have converted from the conventional metal key locks to the electronic locks.

Environmental control systems are used to control the energy consumption of the various electrical appliances in a room. Typically, hotels employ them to control the heating and cooling unit (HVAC units) of the room. An environmental control system conventionally comprises a motion detector mounted on a wall of the room for detecting when the guest is in the room; a door switch which detects a change in state of the door; e.g. opening and closing of the door; and an energy control unit which is connected to the various electrical appliances of the room. The energy control unit controls the energy consumption of the various electrical appliances in the room, especially the heating, ventilating and air conditioning (HVAC) unit. When the door switch changes state, e.g. the door opens and a guest enters the room, the motion detector is activated to detect the presence of a guest in the room. The motion detector then sends a signal to the energy control unit to set the temperature to some acceptable level. When the guest leaves the room by opening and closing the door, the door switch changes state and the motion detector is activated and detects the absence of the guest. The motion detector then sends a signal to the energy control unit and the energy control unit resets the temperature to allow for a broader temperature range and thus less energy consumption. For instance, in the winter, the guest may set the room temperature at 75° F. (25° C.). However, the hotel management prefers to have the room temperature at 60° F. (15° C.) when the guest is not in the room. The energy control sets the heating unit to the various temperatures depending upon whether the motion detector detects the presence or absence of the guest in the room. The energy control unit can be connected to other electrical appliances other than the HVAC unit. For example, the energy control unit can be connected to the lights, television and radio to insure that these are turned off when the guest leaves the room.

Generally, when a guest has checked into a hotel and has been assigned a room, the room is referred to as being in a sold state. If a room has not been assigned to a guest or if the guest has checked out, then the room is referred to as being in the unsold state.

Furthermore, it should be appreciated that when a room is in the sold state, it can be either in an occupied state, i.e. the guest is present in the room, or in an unoccupied state, i.e. the guest is absent from the room. Generally, the hotel management sets the unsold temperature range at between 85° F. (30° C.) and 50° F. (10° C.) and the sold temperature range at between 75° F. (25° C.) and 60° F. (15° C.). The heating/cooling units are off so long as the room temperature stays within the range. Conventionally, the hotel guest is able to further adjust the temperature range to his specific preference, for example at 70° F. (20° C.) when he occupies the room.

The motion detector communicates with the energy control unit either by wiring of the two units together or by electromagnetic waves (radio or light). Additionally, some environmental control systems as well as some electronic locks are wired to a main terminal which is located at a main desk so that they can be controlled from the main desk.

Using wire to connect the main terminal to the environmental control system and/or the lock is expensive and time-consuming to install. There is a need for a stand-alone lock system that communicates directly with the environmental control system for the room.

SUMMARY OF THE INVENTION

The present invention combines a stand-alone electronic lock system with an energy control means, and provides for the lock to instruct the energy control means when to move from the unsold to the sold state. The electronic lock system communicates to the energy control means when a guest has used a guest card key in the lock such that the energy control means moves from the unsold state to the sold state. In a preferred embodiment, a motion detector and a door switch is employed such that the sold state can be further divided between an occupied state and an unoccupied state. This provides for additional energy savings when the guest is not in the room.

Broadly, the present invention is directed to an electronic lock system having an electronic lock mounted in a door of a room to provide access to said room, and a guest key card with a guest key code thereon for opening said lock, the lock having a means for storing a guest access code, a means for reading said guest key code when said guest key card is inserted into said lock and a means for comparing said guest key code with said guest access code such that if said guest key code matches said guest access code said lock opens, the improvement comprising:

(a) an energy control means, said energy control means controlling the temperature in said room, said energy control means having a means for communicating directly with said lock, and having at least two modes, a sold mode and an unsold mode, said unsold mode having a wider temperature range than said sold mode temperature range; and (b) said lock having a means for communicating directly with said energy control means such that when said lock is opened by said guest key said lock communicates to said energy control means such that said energy control means moves from said unsold mode to said sold mode.

The lock can communicate with the energy control means each time a guest key card is used in the lock to insure that after a guest key card is used in the lock the energy control means is in the sold mode. Alternatively, the lock will communicate only the first time a new guest key card is used in the lock such that the energy control means moves to a sold mode. In either of these cases, a hotel staff or other card key will have to be used to move the energy control means from the sold to the unsold state. Alternatively, where the lock communicates every time the guest key card is used in the lock, either the lock or the energy control means has a clock which keeps track of the amount of time that has gone by since the guest key card was last used in the lock, and automatically after a set period of time, say 24 hours, instructs the energy control means to move from a sold to an unsold mode.

Preferably, the guest key card has a start time thereon, such that when it is inserted into the lock, the start time dictates when to move the room from the unsold to the sold state and either the end time or the time period during which the key is valid, such that at the end time or the end of the time period during which the key is valid, the lock instructs the energy control means to move from the sold to the unsold mode. When times are used, the start time and end time/time period can be sent to the energy control means each time the guest key card is used in the lock; or the first time the guest key card is used in the lock. In either case, the energy control means must have a clock so that the energy control means knows when the end time has arrived. Alternatively, the lock has a clock and sends a signal to the energy control means when to start the sold mode and when to end the sold mode and move to the unsold mode.

Preferably, the electronic lock system further comprises a means for detecting when a person is in said room. Such means for detection comprises a detector mounted on the wall or contained in the lock, and a door switch mounted to the door frame or included in the lock. The detector is preferably a motion detector such as a passive infrared detector (PIR), or an ultrasonic detector. Such means are conventional. By using the detector and the door switch, the sold mode is divided into an occupied mode for when the room is occupied and an unoccupied mode for when the guest is out of the room. This provides for additional energy savings.

During the occupied mode, the temperature is set to that which was chosen by the guest, while during the unoccupied mode the energy control means returns the temperature to the sold mode as set by the hotel management. For example, the hotel management may set the sold temperature range at 60° F. (15° C.) to 75° F. (25° C.) while the guest sets the temperature at 70° F. (20° C.). During the occupied mode, the energy control means maintains the temperature at about 70° F. (20° C.). When the guest leaves the room and the electronic lock system detects that the guest has left, and the energy control means moves to the unoccupied mode allowing the room temperature to drift within the range of 60° F. (15° C.) and 75° F. (25° C.). Upon detecting the return of the guest, the electronic lock system has the energy control means return the room temperature to about 70° F. (20° C.) as set by the guest.

In order to implement this occupied/unoccupied option, the electronic lock system has:

(a) said sold mode of said energy control means further comprising an occupied mode and an unoccupied mode;

(b) a means for setting the temperature such that a person can set the temperature in the room when said energy control means is in said sold mode; and (c) a means for detecting when a person is in said room, said means for detecting having a means for communicating with said energy control means such that when said detection means detects a person in said room and said energy control means is in said sold mode, said detection means communicates with said energy control means and said energy control means operate in said occupied mode and when said detection means detects the absence of a person in said room and said energy control means is in said sold state, said detection means communicates with said energy control means and said energy control means operate in said unoccupied mode.

DETAILED DESCRIPTION

Figure 1:
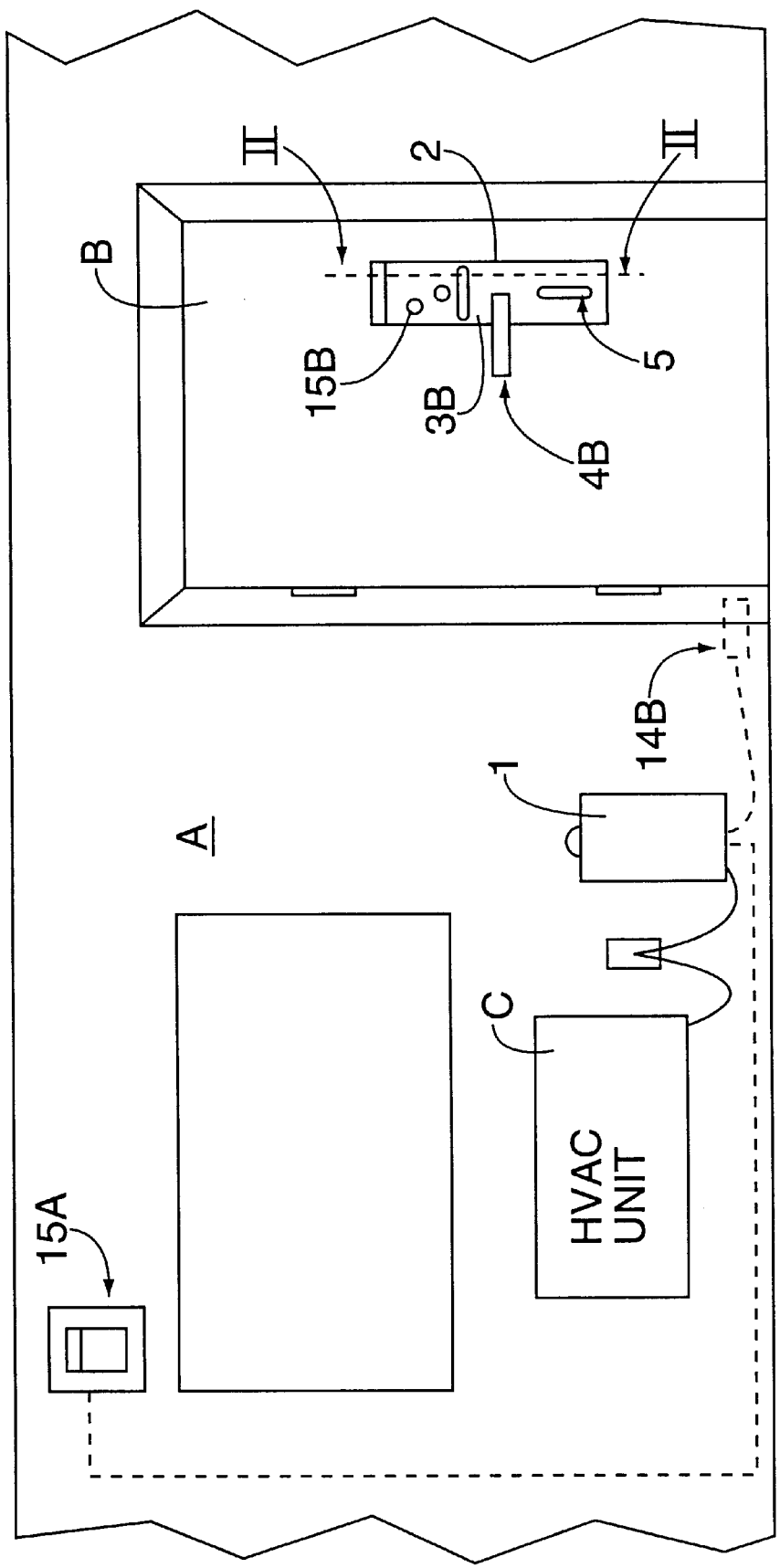
FIG. 1 shows schematically a vertical section on an interior wall of a room wherein the door to the room is provided with an environmental control lock system according to the present invention.
Figure 2:
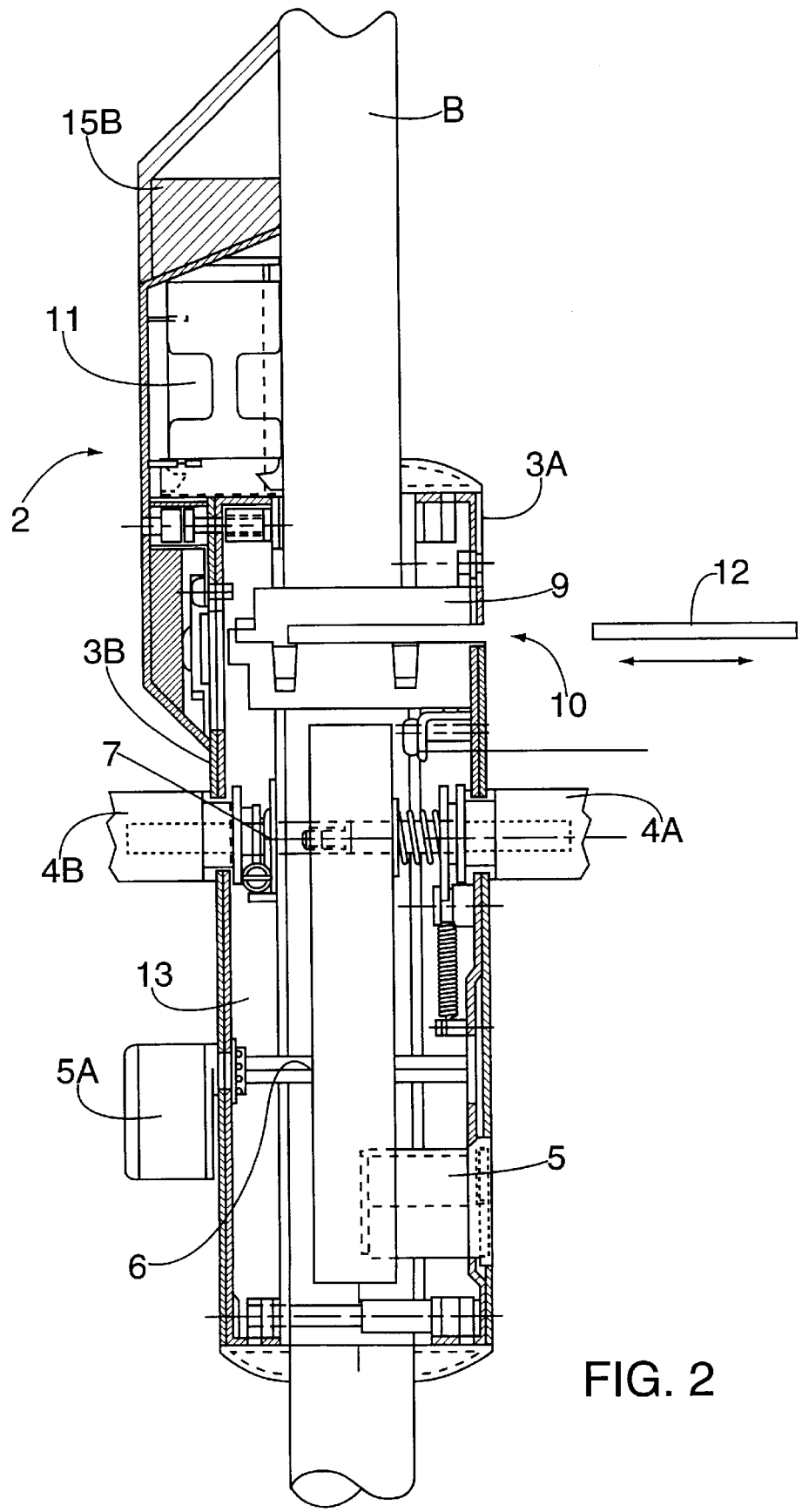
FIG. 2 shows schematically a vertical section through the front edge of a door provided with a lock according to the present invention, seen along line II—II on FIG. 1.

FIG. 1 shows schematically a vertical elevation of interior wall A of a room having door B therein. Against wall A is mounted HVAC unit C for the room and near HVAC unit C is mounted energy control means 1. Door B has lock 2 mounted therein. The door B is provided with lock 2 according to the present invention. FIG. 2 shows enlarged a vertical section through a part of the door B with lock 2, seen along line II—II on FIG. 1.

Referring now to FIGS. 1 and 2, the different parts of the system of the present invention will be described. Lock 2 comprises exterior escutcheon 3A and interior escutcheon 3B. Exterior door handle 4A is used to open door B from the outside while interior door handle 4B is used to open door B from the inside of the room. A conventional cylinder lock 5 is set in lock 2 with deadbolt thumb turn 5A which is intended for use by the guests for additional security. Lock case 6 contains an electronic locking device which contains mechanical means for locking door B in the door jamb. Pin 7 interconnects interior door handle 4B to exterior door handle 4A. Pin 7 is locked by means of the electronic locking device contained in lock case 6 such that when the door is locked, the rotation of exterior door handle 4A is prevented. Lock 2 is intended to be operated by means of key card 12, containing a key code which is read or sensored by code reading unit 9 internally arranged in lock 2. Reader 9 is, for this purpose, equipped with slot 10 having a shape and size which permit key card 12 to be inserted.

If the key code on key card 12 matches an access code, the electric motor in lock case 6 will be actuated, releasing exterior door handle 4A so that door B, by turning exterior door handle 4B, may be opened. Current actuating the electric motor in lock case 6 is supplied from current source 11, such as a battery. Lock 2 is further equipped with a microcontroller 13, powered by current source 11. Microcontroller 13 is provided with a memory and a means for comparing the information which is read and the information contained in the memory, i.e. access codes. These access codes may be loaded into the memory and stored in the memory or may be calculated by means of an algorithm by microcontroller 13. According to the present invention, the microcontroller 13 decides whether the electric motor in lock case 6 should be activated, i.e. if the key code matches an access code. When key card 12 is inserted into opening 10, reader 9 reads the key code of key card 12. Reading unit 9 is also powered by battery 11. Battery 11 is arranged on the interior side of the door as shown in FIG. 2.

Card reader 9 is equipped with a section which is intended to read the key code of key card 12. Microcontroller 13 compares the key code with the access code and if the two match, then the electric motor in lock case 6 is activated. If the key code and access code do not match, then the electric motor in lock case 6 is not activated and access to the room by door B is denied to the card user.

Figure 3:
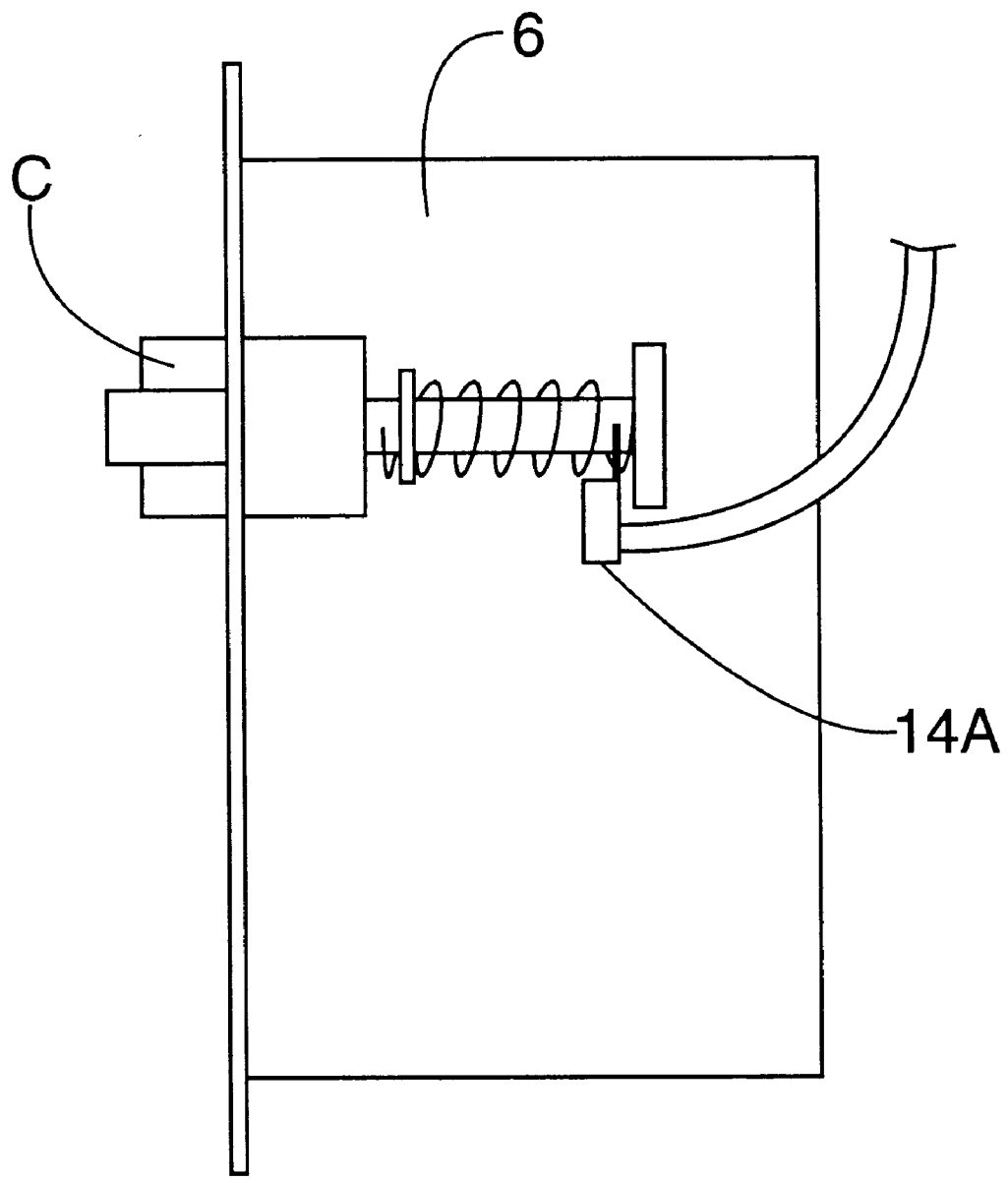
FIG. 3 shows schematically the inside of a lock case with a door switch.

In the preferred embodiment where both the detector and the door switch are used, either or both of these units can be contained in the lock or separate from the lock. As shown in FIG. 3, door switch 14A is mounted in lock case 6. Switch 14A detects when door B has changed state, i.e. opened or closed. Optionally, door switch 14B is used rather than door switch 14A. Door switch 14B can be located anywhere on the edge of door B such that when the door is separated from the door jamb the pressure switch of switch 14B is released and the switch changes state. It is preferred that door switch 14A be located in lock 2 itself such that every time the door is opened, switch 14A has a change of state and tells microcontroller 13. Door switch 14B is preferably wired to energy control means 1. Alternatively, switch 14B communicates with energy control means 1 in a wireless manner. Naturally, switch 14B can be mounted in door B itself or on the outside of door B.

Mounted in lock 2 is motion detector 15B for detecting the presence of a person in the room. Optionally, motion detector 15A is mounted on wall A. Motion detector 15A is preferably mounted on a wall of the room in a location which allows it to view the whole room. In certain room configurations, suites or multi-roomed areas, it may be necessary or desirable to use more than one motion detector to detect the presence of the guest in the room. If motion detector 15A is employed in the present invention, it is preferably powered from the hotel, not battery-powered, and is always on. Preferably, motion detector 15B is used in the present invention. Motion detector 15B is mounted in lock 2 on the inside and is able to view the whole room. Motion detector 15A is preferably wired to energy control means 1. Motion detector 15A can also communicate with energy control means 1 in a wireless manner such as by electromagnetic waves (radio, light, etc.).

With the present invention and the use of the occupied-unoccupied modes and the motion detector/door switch, after detecting a change instate of the door switch, the motion detector is activated to detect the presence of a person in the room. With motion detector 15A, it will communicate, preferably directly to energy control means 1, as shown in FIG. 1. If the guest is detected in the room by motion detector 15B, then motion detector 15B communicates with microcontroller 13 and microcontroller 13 communicates this to energy control means 1 which in turn then operates in an occupied state and allows the temperature of the room to move to the temperature as set by the occupant-guest.

Microcontroller 13 communicates with energy control means 1 various bits of information. The primary bit of information that microcontroller 13 communicates to energy control means 1 is the status of the room from sold to unsold. For example, the start time and end time or the time period of the new guest. Additionally, where lock 2 has door switch 14A, microcontroller 13 also communicates changes in state for door switch 14A, i.e. opening and closing of door B. Additionally, where lock 2 houses motion detector 15B, microcontroller 13 communicates to energy control means 1, the presence or absence of a person in the room so that the energy control means 1 moves between occupied and unoccupied states. Where the electronic lock system of the present invention uses door switch 14B and/or motion detector 15A, these components are, preferably, directly wired to energy control means 1 and microcontroller 13 need not communicate these bits of information to energy control means 1. Energy control means 1 processes these various bits of information and controls the energy consumption of the HVAC or other electrical appliances in the room.

Figure 4:
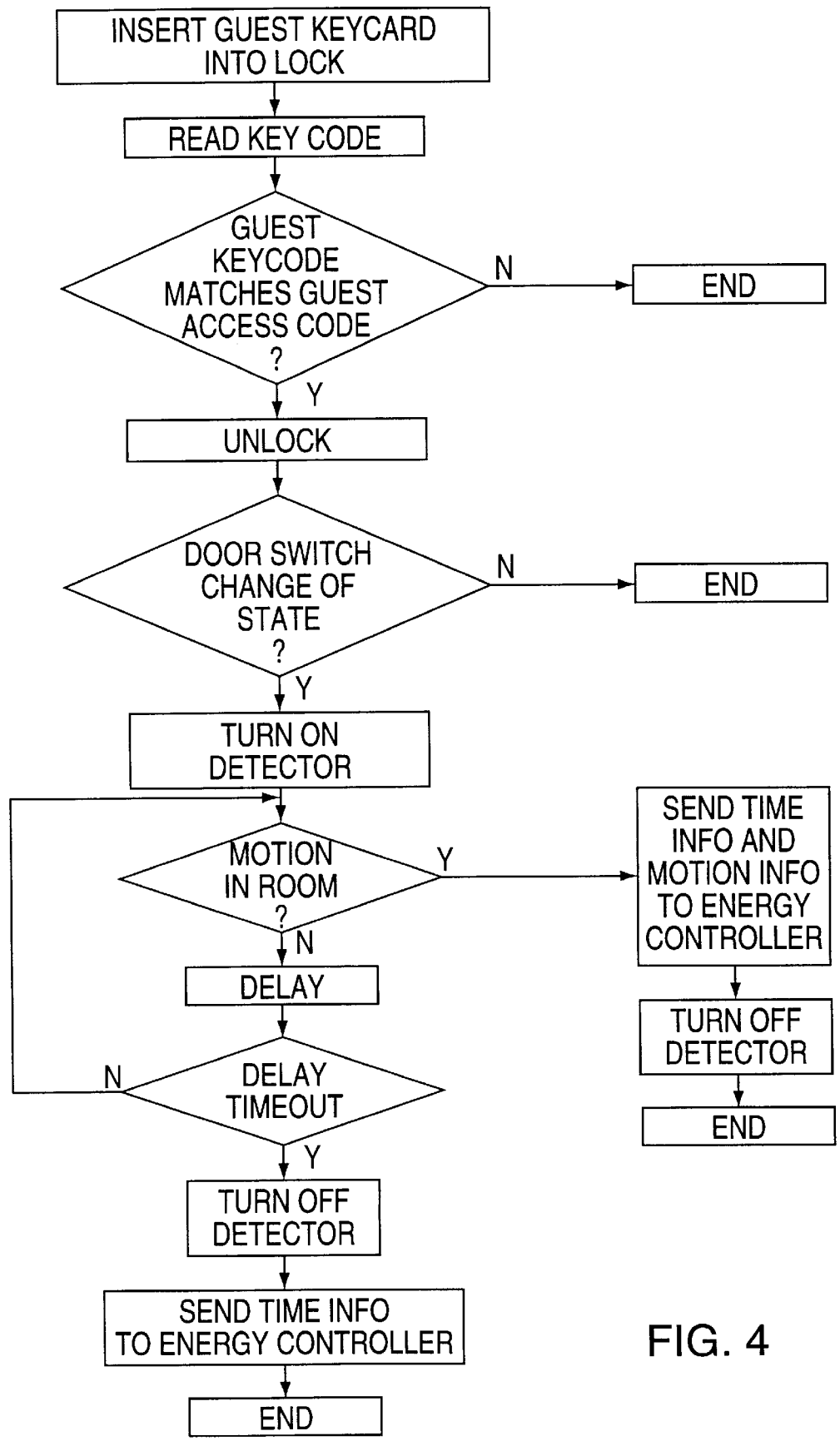
FIG. 4 is a flow diagram of the logic of the lock after a guest key card has been inserted into the lock and where both the motion detector and the door switch are connected to the microcontroller of the lock.

FIG. 4 illustrates the flow diagram of the lock every time a card key is inserted into the lock and both the motion detector and the door switch communicate directly to the microcontroller of the lock. As shown in FIG. 4, the key card has an end time or time period for the stay of the guest, this information is recorded in the lock's microcontroller so the microcontroller can communicate this information to the energy control means so that the energy control means can move from a sold mode to an unsold mode. Absent this option, hotel staff may turn the energy control means from the sold mode to the unsold mode. This is normally done when hotel staff cleans the room after the guest has checked out. Typically, a staff card is used to lock-out the guest after the guest has checked out of the hotel and this staff card also instructs the energy control means to move from the sold to the unsold mode. Alternatively, the energy control means can be pre-programmed to move from the sold mode to the unsold mode after a period of time since the guest card was last used. Also, as shown in FIG. 4, the motion detector is used to allow the system to move between the occupied and unoccupied modes.

Figure 5:
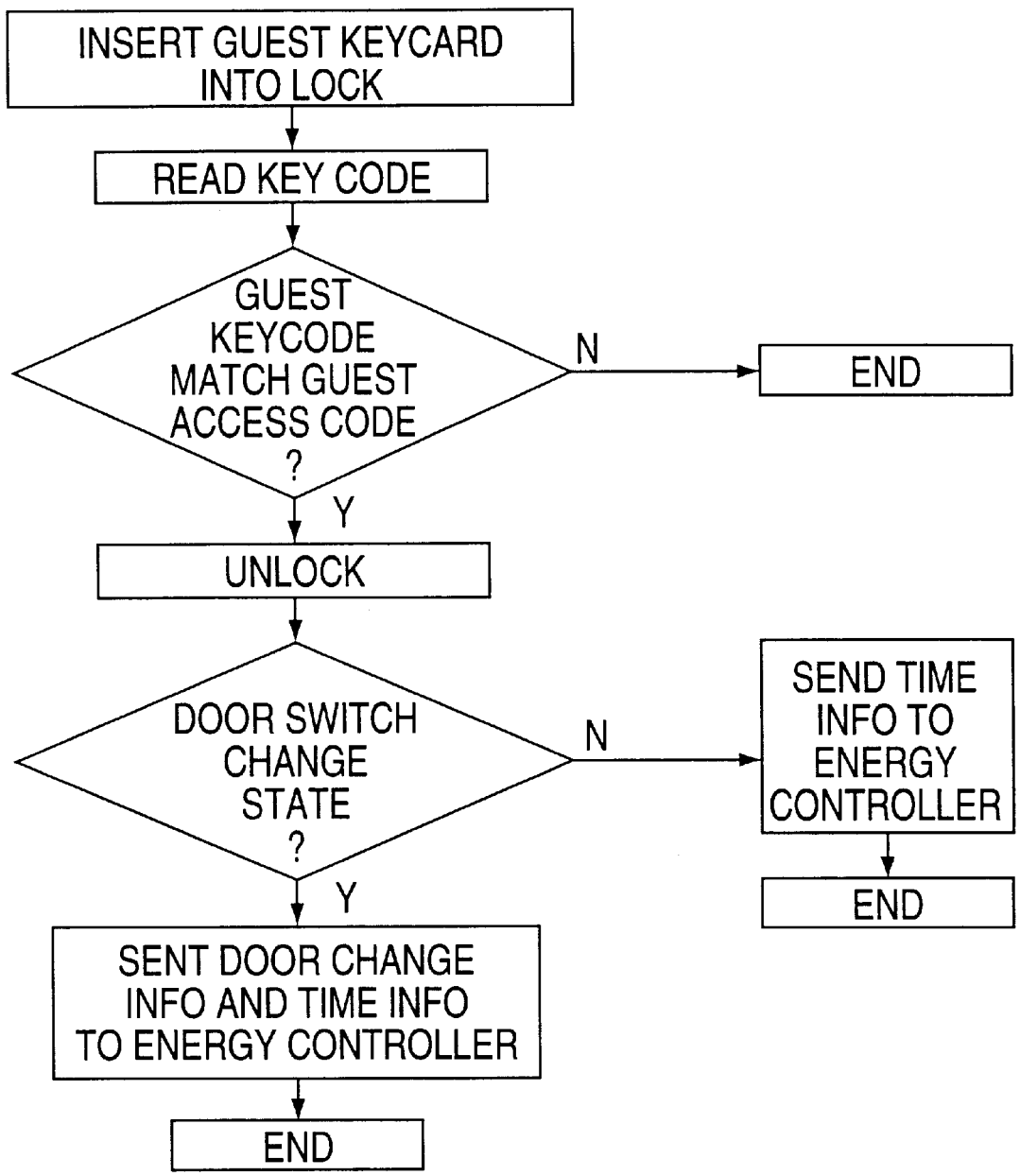
FIG. 5 is a flow diagram of the logic of the lock after a guest key card has been inserted into the lock and the detector is connected to the energy control means while the door switch is connected to the microcontroller of the lock.

FIG. 5 illustrates the flow diagram of the lock where the motion detector communicates directly to the energy control means while the door switch communicates with the lock itself. Again, because of the motion detector, the system can operate in an occupied and unoccupied mode.

Figure 6:
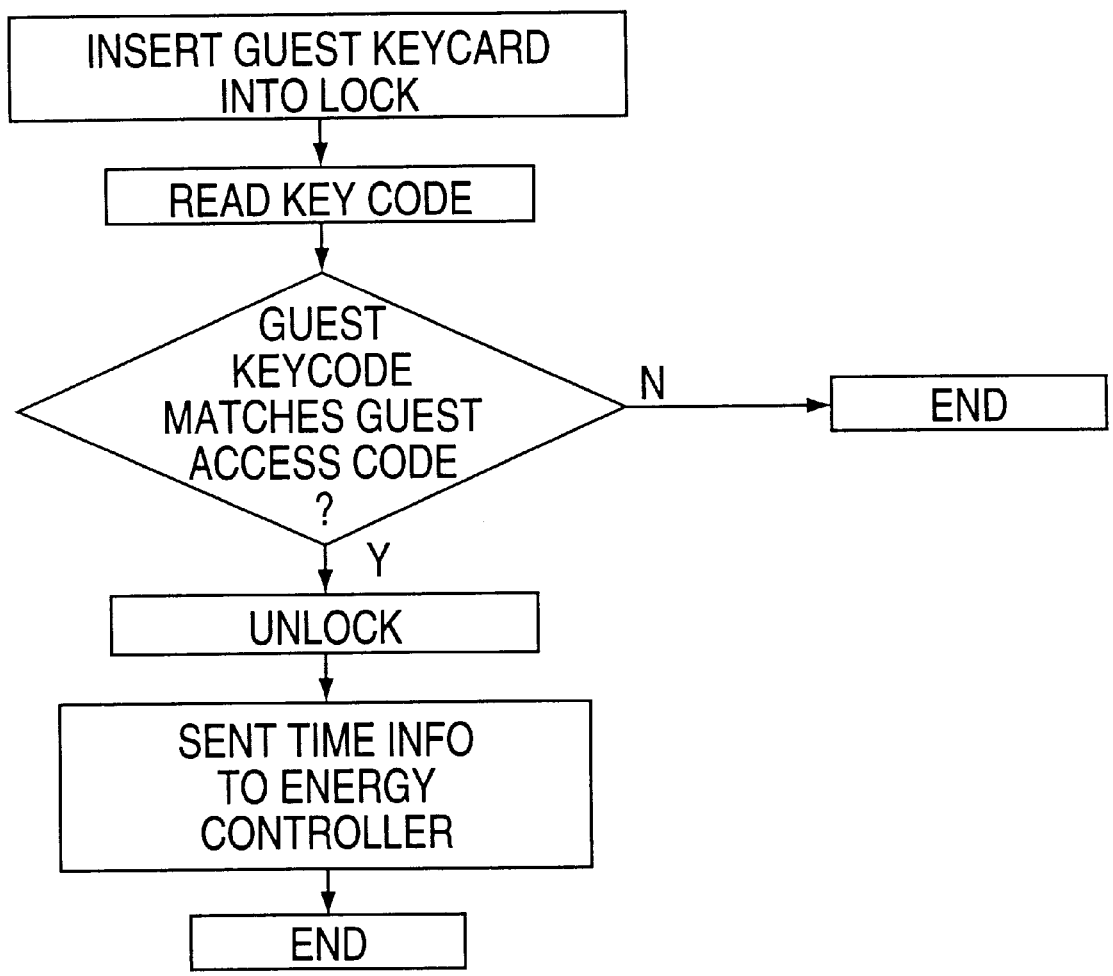
FIG. 6 is a flow diagram of the logic of the lock after a guest key card has been inserted into the lock and both the detector and the door switch are connected to the energy control means.

FIG. 6 illustrates the flow diagram of the lock where both the motion detector and the door switch are connected to the energy control means. In this embodiment, the lock's main function is to communicate to the energy control means the start of the sold period, and if the key card contains the end time or time period, the end time for the sold period, i.e. when to move from the sold to the unsold mode.

Figure 7:
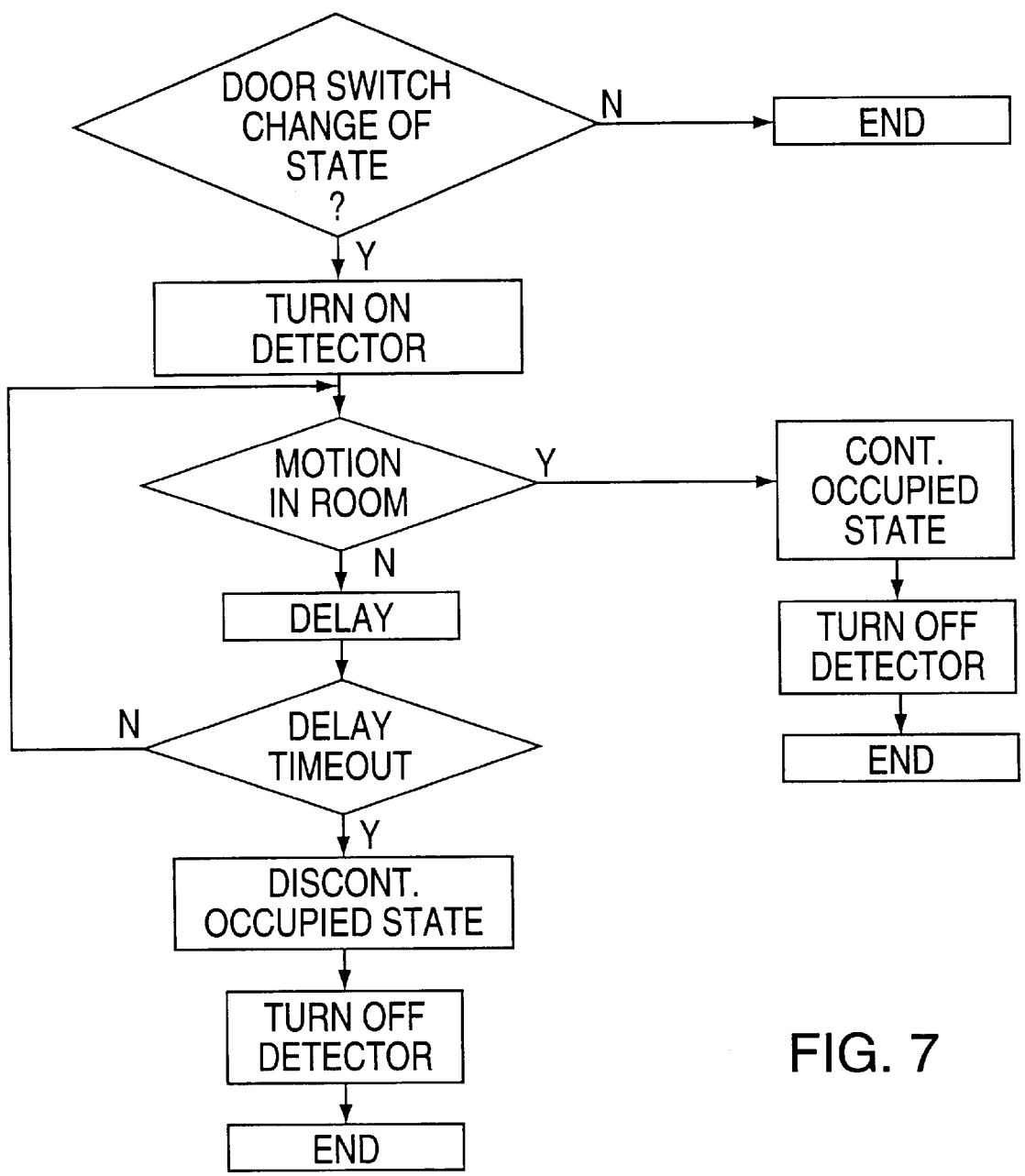
FIG. 7 is a flow diagram of the logic of the present invention when the door is opened without a card key and the room is in the occupied mode.

FIG. 7 illustrates where both a motion detector and a door switch are used, the room is in the occupied mode, and the door has been opened from the inside.

It will be understood that the door switch, once it changes state, communicates this fact to the motion detector and the motion detector is turned on so that it can detect the presence or absence of a guest in the room. This change of state occurs once when the door opens and once when the door closes. The door switch can communicate its change of state to the motion detector each time it changes state or only once, either when it opens or when it closes. Likewise, the motion detector can scan the room each time the door switch communicates a change of state or only once, either when the door is opened or when the door is closed.

The motion detector must scan the room long enough to obtain an accurate determination that the room is either occupied or not occupied. Scanning can start as soon as the door is opened, first change in state of the door switch, and not end until after the door closes, the second change in state of the door switch. Alternatively, the scanning continues for a preset period of time. In one preferred embodiment, a scanning sequence starts upon the first change of state of the door switch and continues for a preset period of time. In another preferred embodiment, a scanning sequence starts upon the second change in state of the door switch and continues for a preset period of time. In yet another preferred embodiment, a scanning sequence starts each time the door switch changes state and continues for a preset period of time. The scanning sequence is the same no matter whether a key opens the door or the door is opened from the inside of the room.

Energy control means 1 is a conventional piece of equipment except that it has a means for communicating with lock 2. Energy control means can control not only the heating and cooling units for the room, but also all the other electrical appliances in the room such that when the guest leaves, not only does the heating and cooling unit for the room move to an unoccupied mode, but the lights, etc. are turned off.

Energy control means 1 and lock 2 each have a means to communicate with the other. This means can be wire or, more preferably, is wireless, such as infrared transmission or some other electromagnetic means.

Figure 8:
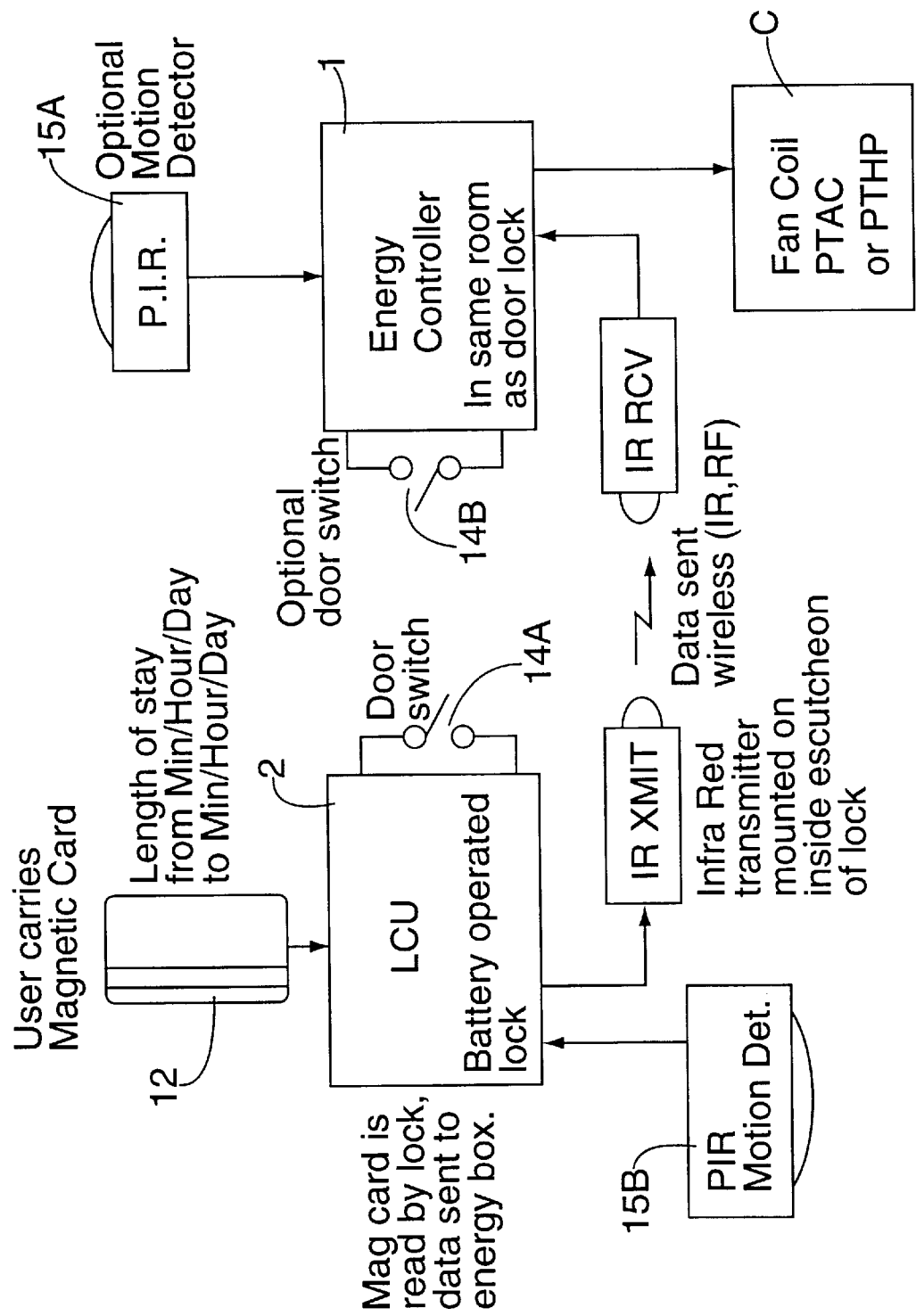
FIG. 8 illustrates different embodiments of the preferred hardware configurations of the present invention.

FIG. 8 is a different embodiment of the preferred components and how they communicate with one another. Referring to FIG. 8, magnetic key card 12 has the length of stay with a start time in minutes/hours/day to an end time in minutes/hours/day. The key card is inserted into lock 2 and the data is read off of key card 12 and communicated to energy control means 1. To allow lock 2 to communicate with energy control means 1, lock 2 has an infrared transmitter mounted inside escutcheon 3B of lock 2. Energy control means 1 has an infrared receiver which is able to receive signals from the infrared transmitter of lock 2. In this way lock 2 communicates the start and end times or sold and unsold times.

Optionally as shown in FIG. 8, either lock 2 or energy control means 1 is connected to motion detector 15A/15B. Where lock 2 is connected to motion detector 15B, the infrared transmitter of lock 2 is used to send the necessary motion or no motion data to energy control means 1.

Also, as shown in FIG. 8, either lock 2 or energy control means 1 is connected to door switch 14A/14B. Where lock 2 is connected to door switch 14A, the infrared transmitter of lock 2 is used to send the change in state of the door switch to energy control means 1. Energy control means 1 communicates, preferably by wire, to HVAC unit C and specifically to the fan coil, the air conditioning unit, or the heating unit.

Figure 9:
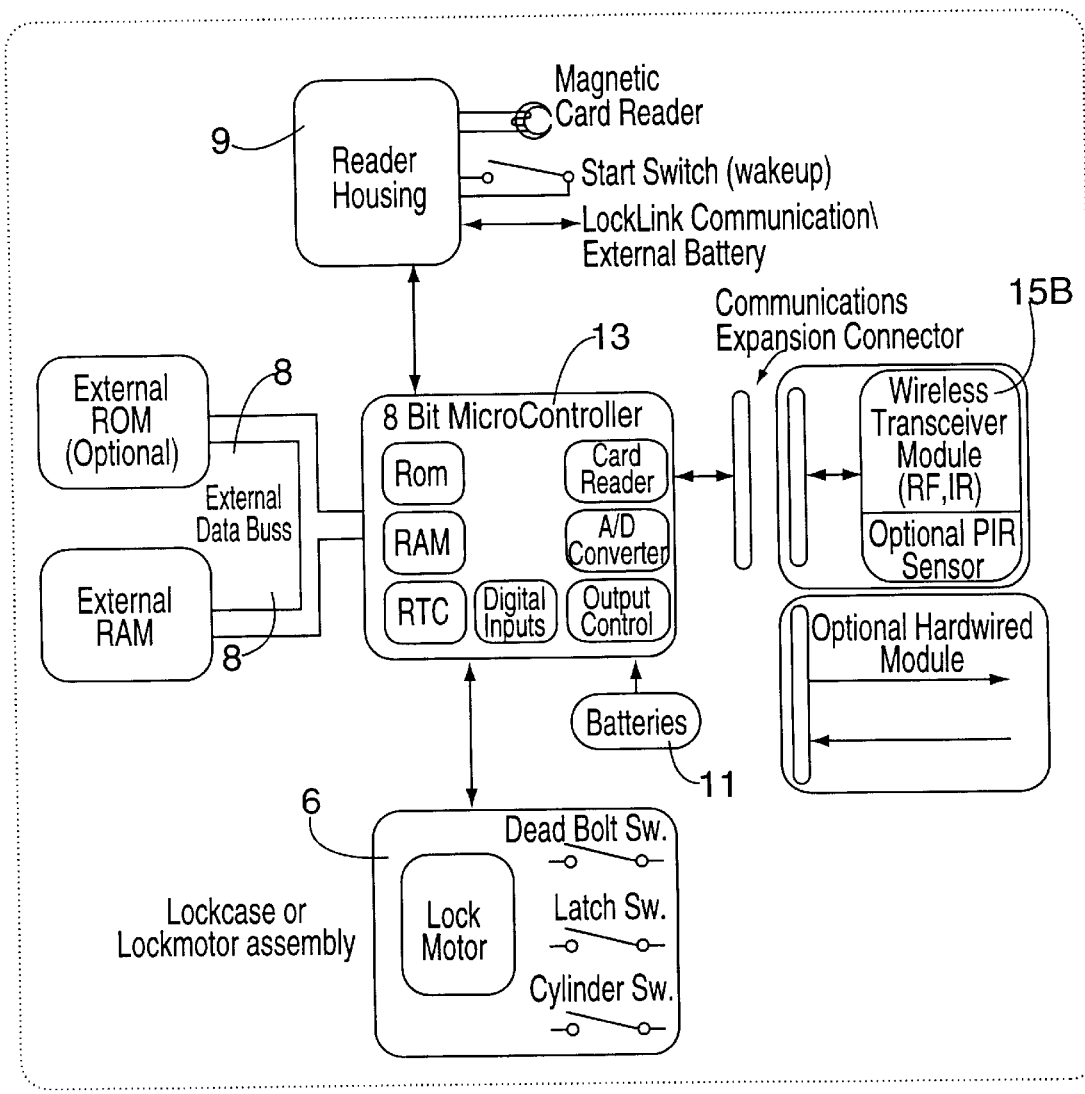
FIG. 9 is a detailed schematic of the electrical hardware for the lock.

FIG. 9 is a more detailed schematic of the lock itself. Lock 2 and, more specifically, microcontroller 13 is capable of allowing access to more than one card holder. For example, in a hotel situation, lock 2 will open not only for a guest but also for other hotel staff and security personnel. Conventionally, such locks are referred to as having a hierarchy system and microcontroller 13 is able to compare key codes of the different cards and allow access simultaneously to these different personnel. In other words, a guest will hold a guest key card and the lock will provide access to the guest if the guest key card has a key code that matches the guest access code. Likewise, the lock will provide access to hotel staff with a staff key card if the staff key code matches the staff access code.

Although the present invention has been described with reference to a hotel, it is equally applicable to ferries, cruise ships and railroad lines, as well as business offices and communal bathrooms. The present invention is applicable to any location where there is a user of a room and there is a desire to control the energy consumption in the room.

It will be understood that the claims are intended to cover all changes and modifications of the preferred embodiments of the invention herein chosen for the purpose of illustration which do not constitute a departure from the spirit and scope of the invention.

What is claimed is:

1. An improved electronic lock system having an electronic lock mounted in a door of a room to provide access to said room; and a guest key card with a guest key code thereon for opening said lock, said lock having a means for storing a guest access code, a means for reading said guest key code when said guest key card is inserted into said lock and a means for comparing said guest key code with said guest access code such that if said guest key code matches said guest access code said lock opens, the improvement comprising:

(a) an energy control means, said energy control means controlling temperature in said room, said energy control means having a means for communicating directly with said lock, and having at least two modes, a sold mode and an unsold mode, said unsold mode having a wider temperature range than said sold mode temperature range; and (b) said lock having a means for communicating directly with said energy control means such that said lock communicates with said energy control means when said guest key card has been used to open said lock such that said energy control means moves from said unsold mode to said sold mode.

2. The electronic lock system of claim 1 further comprising a means for detecting when a person is in said room.

3. The electronic lock system of claim 2 wherein said means for detecting comprises a detector mounted on a wall of said room and communicating directly with said energy control means; and a door switch mounted in said door jamb for detecting a change in state of said door, said door switch communicating said change of state to said energy control means.

4. The electronic lock system of claim 2 wherein said means for detecting comprises a detector mounted in said lock and a door switch mounted in said lock for detecting a change in state of said door, said detector and said door switch communicating directly to said lock.

5. The electronic lock system of claim 2 wherein said means for detecting comprises a detector mounted on a wall of said room and communicating directly to said energy control means; and a door switch mounted in said lock and communicating directly to said lock.

6. The electronic lock system of claim 1 wherein
(a) said sold mode of said energy control means further comprises an occupied mode and an unoccupied mode;
(b) a means for setting the temperature such that a person can set the temperature in the room to said occupied mode when said energy control means is in said sold mode; and
(c) a detection means for detecting when a person is in said room, said means for detecting having a means for communicating with said energy control means such that, when said detection means detects a person in said room and said energy control means is in said sold mode, said detection means communicates with said energy control means and said energy control means operates in said occupied mode and when said detection means detects the absence of a person in said room and said energy control means is in said sold state, said detection means communicates with said energy control means and said energy control means operates in said unoccupied mode.

7. The electronic lock system of claim 6 wherein said means for detecting comprises a detector mounted on a wall of said room and communicating directly with said energy control means; and a door switch mounted in said door jamb for detecting a change in state of said door, said door switch communicating said change of state to said energy control means.

8. The electronic lock system of claim 6 wherein said means for detecting comprises a detector mounted in said lock and a door switch mounted in said lock for detecting a change in state of said door, said detector and said door switch communicating directly to said lock.

9. The electronic lock system of claim 6 wherein said means for detecting comprises a detector mounted on a wall of said room and communicating directly to said energy control means; and a door switch mounted in said lock and communicating directly to said lock.

10. The electronic lock system of claim 1 wherein the guest key card has a start time and an end time, and said lock communicates to said environmental control means to move to said sold mode at said start time and to said unsold mode at said end time.

11. The electronic lock system of claim 1 wherein said guest key card has a start time and a time period during which the key is valid, and said lock communicates to said environmental control means to move to said sold mode at said start time and to said unsold mode upon termination of said time period.

12. The electronic lock system of claim 10 wherein said lock has a clock.

13. The electronic lock system of claim 10 wherein said environmental control means has a clock.

14. The electronic lock system of claim 11 wherein said lock has a clock.

15. The electronic lock system of claim 11 wherein said environmental control means has a clock.

16. A method for controlling an energy control means used for controlling the temperature in a room, said method comprising:
(a) inserting a guest key card in an electronic lock mounted in a door of a room such that said lock reads a guest key code off of said guest key card and opens said lock;
(b) communicating to said energy control means that said lock has been opened by said guest key card; and
(c) moving said energy control means from an unsold state to a sold state.

17. The method of claim 16 wherein said method further comprises the steps of:
(a) detecting the presence or absence of a person in said room each time said door changes state; and
(b) communicating to said energy control means the presence or absence of a person in said room.

* * * * *

UNITED STATES PATENT AND TRADEMARK OFFICE
CERTIFICATE OF CORRECTION

PATENT NO. : 5,933,085
DATED : August 3, 1999
INVENTOR(S) : Glen Holcomb et al.

It is certified that error appears in the above-indentified patent and that said Letters Patent is hereby corrected as shown below:

Column 2, line 18, delete "other".

Coumn 6, line 25, change "instate" to --in state--; line 36, change "with" to --the--.

Column 10, line 13 (claim 10), change "environmental" to --energy--; line 20 (claim 11) change "environmental" to --energy--; line 26 (claim 13), change "environmental" to --energy--; line 31 (claim 15), change "environmental" to --energy--.

Column 8, claim 1, line 62, after "controlling" insert --the--.

Signed and Sealed this

Twenty-eighth Day of December, 1999

Attest:

Q. TODD DICKINSON

*Attesting Officer*  *Acting Commissioner of Patents and Trademarks*